United States Patent [19]

Huggins

[11] Patent Number: 4,687,925
[45] Date of Patent: Aug. 18, 1987

[54] BELT SPEED MEASUREMENT USING AN OPTICAL FIBER REFLECTOMETER
[75] Inventor: Raymond W. Huggins, Mercer Island, Wash.
[73] Assignee: Xerox Corporation, Stamford, Conn.
[21] Appl. No.: 773,154
[22] Filed: Sep. 6, 1985
[51] Int. Cl.[4] ............................................. G01P 3/36
[52] U.S. Cl. .................................. 250/223 R; 356/28
[58] Field of Search .................... 250/223 R, 571; 324/175; 356/27, 28, 28.5

[56] References Cited

U.S. PATENT DOCUMENTS

| | | | |
|---|---|---|---|
| 3,689,157 | 9/1972 | Andermo | 356/28 |
| 4,311,383 | 1/1982 | Ohtsubo | 356/28 X |
| 4,423,923 | 1/1984 | Frazier et al. | 350/96.15 |
| 4,432,599 | 2/1984 | McMahon | 350/96.15 |

Primary Examiner—Eugene R. LaRoche
Assistant Examiner—Steven J. Mottola
Attorney, Agent, or Firm—R. F. Chapuran

[57] ABSTRACT

The present invention is concerned with directly measuring belt speed by placing two high resolution single fiber optical reflectometers a known distance apart on a line parallel to the belt motion. The signal from the first reflectometer is delayed and the cross correlation function of the two signals is calculated in real time. The cross correlation function can be maximized by varying the delay. When the maximum is observed, the belt velocity may be found by dividing the reflectometer separation by the delay.

7 Claims, 10 Drawing Figures

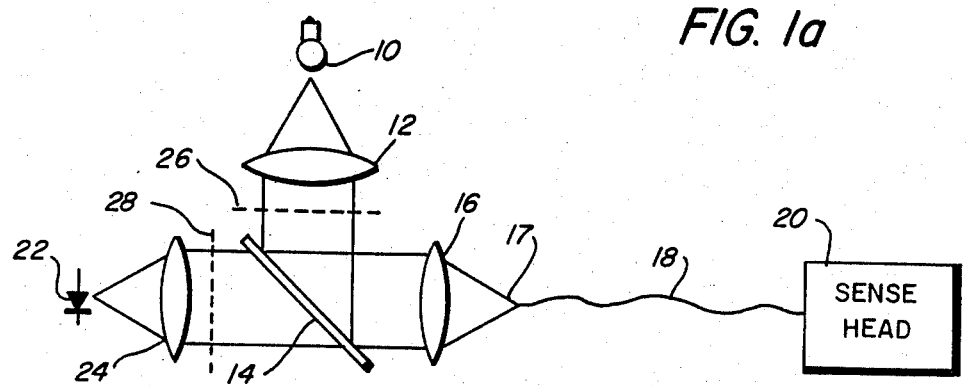
FIG. 1a
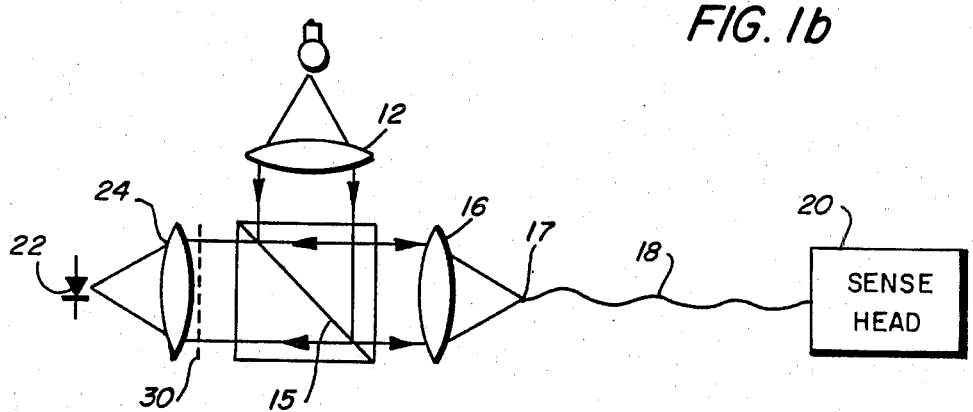
FIG. 1b
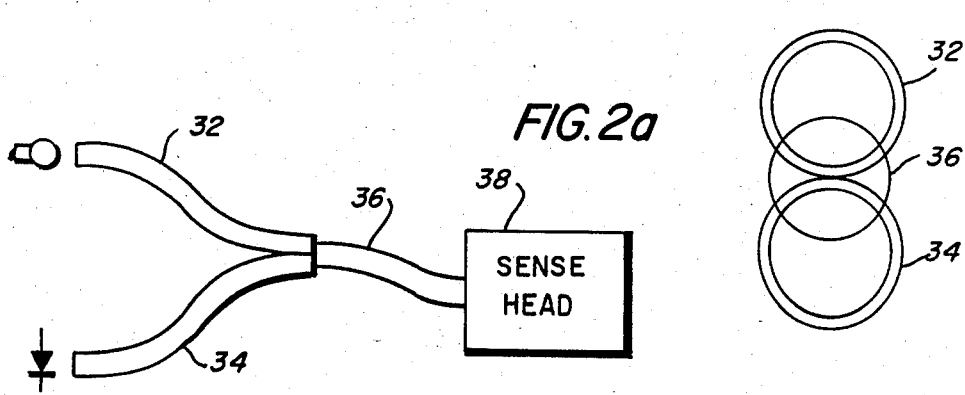
FIG. 2a
FIG. 2b

BELT SPEED MEASUREMENT USING AN OPTICAL FIBER REFLECTOMETER

This invention relates to a belt speed measurement device and, in particular, to a fiber optic reflectometer speed measuring device.

It is common practice throughout the electro-optic industry to accomplish the coupling of radiant flux from an emitting device such as a Light Emitting Diode into a fiber optic light guide by positioning the fiber near the surface of the active element. In this manner, the maximum amount of energy is coupled into the light guide so that losses are kept to a minimum.

It is also known in the prior art to use fiber optics as sensors. U.S. Pat. No. 4,432,599 describes a movable optical fiber with its end face positioned opposite the end faces of a multiplicty of mutually adjacent fixed optical fibers. The axis of the movable optical fiber and the fixed optical fiber are located such that, with the movable optical fiber in its initial position, optical signals propagating therein couple optical signals of substantially equal intensity through the end faces to each of the fixed optical fibers. This optical energy balance is upset when a sensor mechanism, coupled to the movable optical fiber, causes a small displacement of the axis. Small displacements of the movable optical fiber cause the optical energy distribution between the fixed optical fibers to vary substantially linearly with the positional shift of the movable optical fiber. The energy altered signals and the fixed optical signals are converted into corresponding electrical signals by optical detectors which in turn may be coupled to sum and difference amplifiers to obtain appropriate signal sums and differences that may be utilized to establish the total displacement of the movable optical fiber axis.

It is also known to use fiber optic reflectometers in sensor applications. Two types of reflectometers have been used. In a conventional design, a beam splitter reflects a laser beam to a sense head and a detector. In another design, a "Y" configuration is used. For example, in U.S. Pat. No. 4,423,923 entitled "Method and Fixtures for Coupling Optical Fibers", discloses a "Y" configuration and forms the basis for a commercially available wand.

In many printing applications, for example ink jet printing, the speed of paper transport belts must be synchronized to a very high degree of accuracy. One method is to use high resolution optical shaft encoders. However, it is difficult to obtain a high degree of precision with a resolver coupled to a drive shaft due to run-out in the drive pulley, and stretching or deformation of the belt as it passes over the pulley. Variations in belt thickness have led to the uncertainty that a sufficiently simple and high accuracy control cannot be obtained using optical shaft encoders.

It would be desirable, therefore, to provide a highly accurate and simple belt synchronization system that is independent of belt thickness.

Accordingly, it is an object of the present invention to provide a new and improved belt synchronization device. Yet another object of the present invention is to provide a synchronization device that has intrinsically high optical resolution. It is still another object of the present invention to provide a synchronization device that is independent of belt thickness. It is another object of the present invention to provide a method of measuring the speed of a belt using a cross correlation technique.

Other objects and advantages of the present invention will become apparent upon reading the following detailed description and upon reference to the drawings.

Briefly, the present invention is concerned with directly measuring the belt speed by placing two high resolution single fiber optical reflectometers a known distance apart on a line parallel to the belt motion. The signal from the first reflectometer is delayed and the cross correlation function of the two signals is calculated in real time. The cross correlation function can be maximized by varying the delay. When the maximum is observed, the belt velocity may be found by dividing the reflectometer separation by the delay.

For a better understanding of the present invention reference may be had to the accompanying drawings wherein the same reference numerals have been applied to like parts and wherein:

FIGS. 1a and 1b are single fiber optic reflectometer arrangements;

FIG. 2a is a three fiber reflectometer;

FIG. 2b is a cross sectional view of a portion of FIG. 2a;

Figure 4:
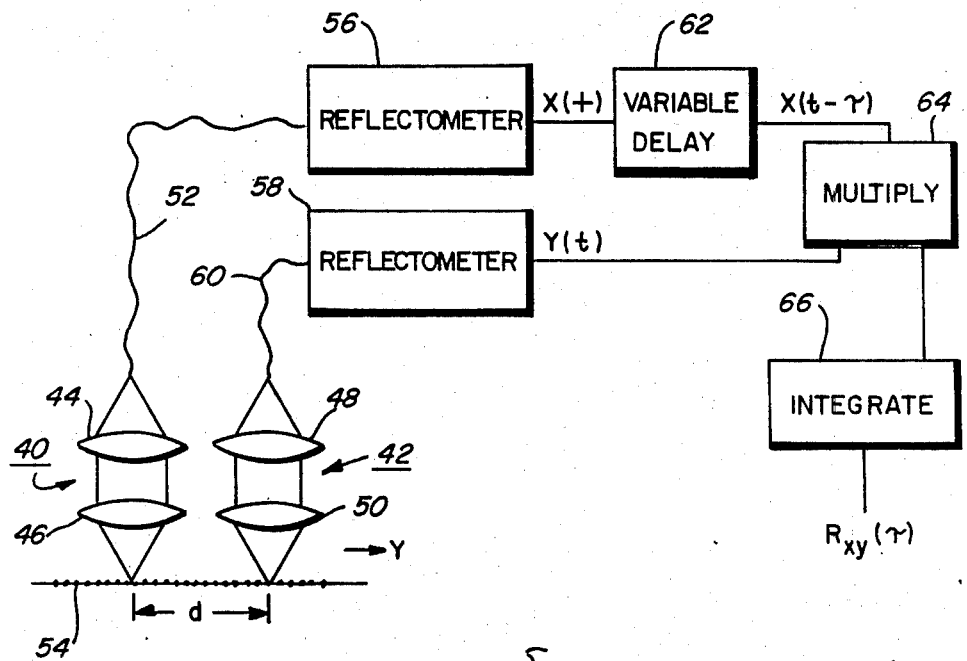
FIG. 4 is an illustration of the cross correlation signal processing scheme in accordance with the present invention.

In single fiber sensors, a single optical fiber transmits optical power to the sensor, and transmits optical power after amplitude or phrase modulation by the sensor, to the detector. Two typical arrangements are shown in FIGS. 1a and 1b. Light from a source 10 is collimated by lens 12, (either a conventional or a GRIN rod lens), partially reflected by a beam splitter 14 in FIG. 1a, or a polarizing beam splitting cube 15 in FIG. 1b, and then focused by lens 16 (either a conventional or GRIN lens), into the end 17 of an optical fiber 18. The light energy propagates along the fiber 18 to the sense head 20 and after modulation by the sense head 20 returns along the same fiber 18. The return light is collimated by lens 16 passes through the beam splitter 14 or polarizing beam splitting cube 15 and is focused onto the detector 22 by lens 24. Polarizers 26 and 28 in FIG. 1a and polarizer 30 in FIG. 1b are adjusted to minimize energy reflected onto the detector by the surface of lens 16 and the end 17 of the optical fiber 18.

For fibers with extremely thin cladding or with easily removed plastic cladding, single fiber reflectometers can be made without any additional optical components. This configuration is referred to as either the "Three Fiber" or "Y" Fiber reflectometer and is shown in FIG. 2a. The source fiber 32 and the detector fiber 34 are held close together and butted up against the signal fiber 36 as shown. Provided the cladding is thin, the cross-sectional overlap between the source or detector fiber 34 and the signal fiber 36 as illustrated in FIG. 2b will approach the geometric maximum of 0.391. This means that 39% of the optical energy propagating down the source fiber 32 will be coupled into the signal fiber 36. Likewise, 39% of the energy propagating back along along the signal fiber 36 from sense head 38 will be coupled into the detector fiber 34 giving an overall optical transfer coefficient of 15%. This number compares favorably with the best optical transfer coefficient of 25% attained with the three lens reflectometer.

Figure 3:
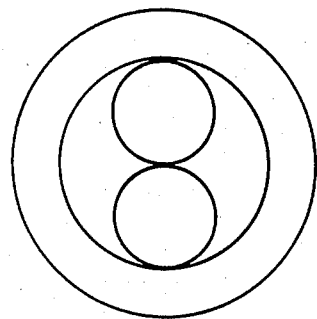
FIG. 3 is an illustration of two fibers epoxied into a connector.

Construction of the "Y" reflectometer is relatively simple. In the case of an optical fiber where the cladding thickness is small in comparison to the core radius, two fibers are simply epoxied into a connector where the diameter equals twice the overall cladding diameter, as illustrated in FIG. 3. The two fiber surfaces are then polished. A fiber coupler is then used to butt the signal fiber 36 up to the detector-source fiber assembly. In cases where the cladding thickness is not thin compared to the core radius, the cladding must first be removed. Because epoxy has a refractive index which exceeds the refractive index of the core, light will leak out of the source fiber 32 into the detector fiber 34 if the two base cores are epoxied into a connector. To overcome this problem the base cores are first coated with a thin layer of a thermoplastic polymer (EPO-TEK 394) which has a refractive index equal to that of the plastic cladding, and then epoxied into the connector. Several "Y" reflectometers have been made using this technique with DuPont S-120 plastic cladded quartz optical fiber. Cross talk between the source fiber and the detector fiber is typically less than 1000:1.

According to the present invention, two sense heads 40, and 42 consist of two lenses 44, 46, and 48, 50 as shown in FIG. 4. Although only one lens is required, two lenses maximize the numerical input and output apertures, thus maximizing both the coupling to the fiber and the collected reflected light.

In a preferred embodiment, the sense head, for example sense head 40, comprises a pair of short focal lenses upper lens 44 and lower lens 46 in a quasi confocal configuration realizing a simple compact high resolution (<200 μm or 0.0008") optical reflectometer. Using this type of reflectometer, individual weft threads in a rubberized canvas paper transport belt (approximately 88 per inch) can easily be resolved as the belt moves in front of the sense head.

Usually, the outside surface of a typical belt has a cloth-like pattern molded upon it to increase the coefficient of friction between the surface and the paper. The spacing between the lines of the pattern is typically 0.015 inches, and individual lines can easily be resolved by a 200 micrometer core single fiber reflectometer with a simple lens placed between the fiber end and the belt.

Also, the optical resolution may be increased by increasing the spacing between the upper lens 44 and the fiber 52, and decreasing the distance between the lower lens 46 and the belt 54, thereby projecting a reduced image of the fiber end onto the belt.

In operation, not every weft fiber is observed due to the presence of the warp fibers. Also, if the fabric is cut such that the warp fibers are not strictly parallel to the motion, an irregular reflected signal could result. However, where cross correlation signal processing is used an irregular signal will be an advantage.

With reference to FIG. 4, the two reflectometer sense heads 40, and 42 are shown a distance "d" apart, and both are able to observe the reflection from the weft threads of the belt.

The sense head 40 is connected to reflectometer 56 through fiber 52 and sense head 42 is connected to reflectometer 58 through fiber 60. The output of reflectometer 56 is conveyed to multiply circuit 64 via a variable delay circuit 62. The output of reflectometer 58 is conveyed directly to multiply circuit 64. The output of the multiply circuit is integrated by the integrating circuit 66 to provide the cross correlation function $R_{xy}(\tau)$.

Figure 5:
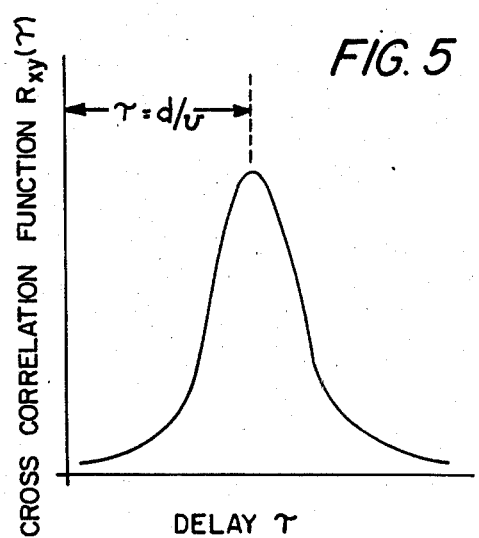
FIG. 5 illustrates the cross correlation function as a function of the time delay.

In particular, if the signal from the reflectometer 56 is designated to be x(t) and from the reflectometer 58 y(t), the cross correlation function may be obtained by delaying x(t) by $\tau$ to give $x(t-\tau)$, multiplying by y(t), and integrating, such that $$R_{xy}(\tau) = \frac{1}{T} \int_0^T x(t-\tau)y(t)dt$$

where $R_{xy}(\tau)$ is the cross correlation function of x(t) and y(t). When the delay $\tau$ equals the sensor separation distance "d" divided by the belt speed v, $R_{xy}(\tau)$ will be a maximum as shown in FIG. 5. The belt speed may be found from the value of $\tau$ which maximizes $R_{xy}(\tau)$.

Figure 6:
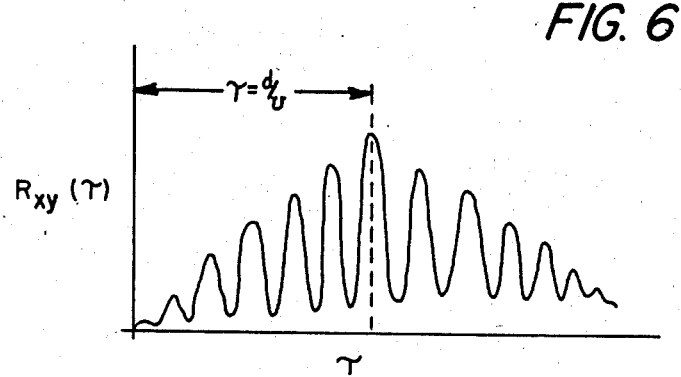
FIG. 6 illustrates the cross correlation function resulting from a regular pattern of weft fibers.

Normally, belts have molded weft fibers which are essentially equally spaced. The equal spacing gives rise to a cross correlation function $R_{xy}(\tau)$ which has a multiplicity of peaks as shown, for example in FIG. 6. The largest peak results when the condition $\tau = d/v$ is satisfied. The two adjacent peaks result when a particular weft fiber is correlated with a neighboring fiber and so on. As a result of the similarity of the amplitudes of the peaks, a peak other than the true peak in the correlation function may be identified as the peak in the cross correlation function, especially if an automated system to identify the peak is employed. The ambiguity in the identification of the true cross correlation function peak can therefore lead to an error in the determination of the speed of the belt.

Figure 7:
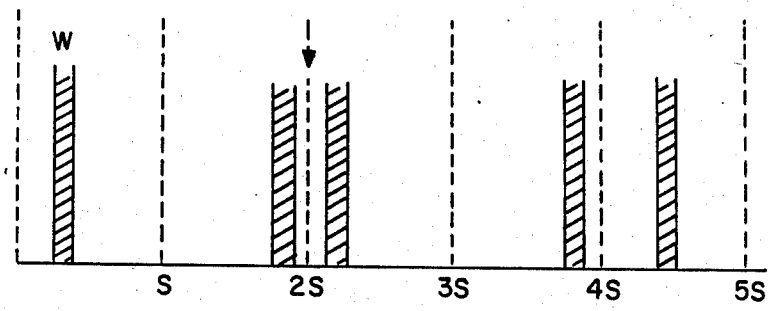
FIG. 7 illustrates quasi randomly spaced weft fibers.
Figure 8:
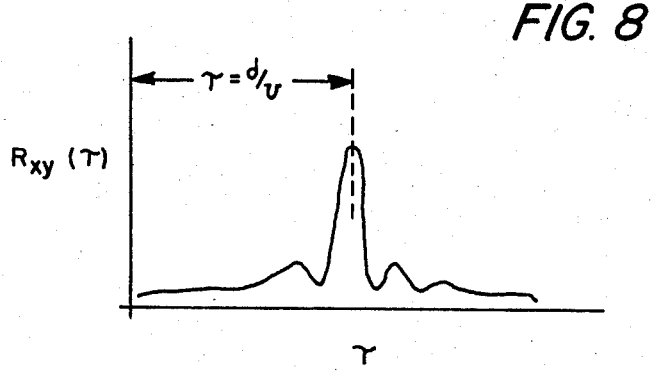
FIG. 8 illustrates the cross correlation function resulting from quasi randomly spaced weft fibers.

In order to reduce the possibility of the erroneous identification of the cross correlation function peak, the molded pattern on the belt has been modified as follows. The mean spacing "s" between the weft fibers is kept constant. However, the spacing between individual fibers is varied randomly with equal probability between w+r (w=width of the fiber, and r=optical solution), the closest spacing which allows the two fibers to be resolved, and 2 s−(r+w). Such a pattern of weft fibers is shown in FIG. 7. The resulting cross correlation function is shown in FIG. 8 where the amplitudes of the adjacent peaks have been dramatically reduced. Therefore, while the mechanical objective of increasing the coefficient of friction between the belt and paper is still maintained, the ambiguity in the peak of the cross correlation function has been considerably reduced.

On the assumption that the delay corresponding to the peak in the cross correlation function can be determined with an accuracy equivalent to 1/10th of a weft fiber, the precision of the measurement will be the reciprocal of the number of fibers per separation distance "d" multiplied by ten, or 1 part in 440 for "d"=0.5 inch. This precision is considerably better than that attainable using laser doppler velocimetry techniques, and probably better than that attainable using an optical shaft encoder unless the belt thinkness can be held constant to 0.001" or better, and any stretching is negligible. Also, the method is noncontacting and inherently simple in view of the powerful microprocessors available for signal processing.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the spirit and scope of the present invention.

I claim:

1. A device for measuring the speed of a moving belt, the belt including molded weft fibers, comprising
   a first optical reflectometer having a sense disposed adjacent to the belt for sensing a portion of the belt,
   a first signal provided by said first optical reflectometer,
   a second optical reflectometer having a sense head disposed adjacent to the belt for sensing said portion of the belt, the first optical reflectometer sense head being spaced from the second optical reflectometer a sense head a given distance on a line substantially parallel to the direction of movement of the belt,
   a second signal provided by said second optical reflectometer,
   a delay circuit for delaying said first signal,
   cross correlation circuitry for determining the cross correlation function of said first and second signals, the cross correlation function including a multiplicity of peaks,
   means to maximize the cross correlation function by varying the delay, and
   means to divide said given distance between the reflectometers by the amount of time delay.

2. The device of claim 1 wherein the molded weft fibers are randomly varied for reducing the multiplicity of peaks in the cross correlation function.

3. A device for measuring the speed of a moving belt comprising
   a first optical reflectometer having a sense head disposed adjacent to the belt for sensing a portion of the belt,
   a first signal provided by said first optical reflectometer,
   a second optical reflectometer having a sense head disposed adjacent to the belt for sensing said portion of the belt, the first optical reflectometer sense head being spaced from the second optical reflectometer a sense head on a line substantially parallel to the direction of movement of the belt,
   a second signal provided by said second optical reflectometer,
   a delay circuit for delaying said first signal,
   cross correlation circuitry for determining the cross correlation function of said first and second signals, said cross correlation function including a multiplicity of peaks, and
   means for reducing the multiplicity of the peaks.

4. The device of claim 3, including means to maximize the cross correlation function by varying the delay.

5. The device of claim 4, including the means to divide the distance between the reflectometers by the amount of time delay.

6. In a device having first and second spaced reflectometers disposed adjacent to a belt, the belt including molded weft fibers, the spacing between individual fibers being varied randomly, the method of measuring the speed of the belt comprising the steps of
   the first reflectometer providing a first signal,
   the second reflectometer providing a second signal,
   delaying one of said first and second signals,
   determining the cross correlation function of the signals, and
   maximizing the cross correlation function by varying the delay.

7. The method of claim 6, including a step of to dividing the distance between the reflectometers by the amount of time delay.

* * * * *